(12) United States Patent
Matsueda et al.

(10) Patent No.: US 8,580,706 B2
(45) Date of Patent: Nov. 12, 2013

(54) EXHAUST GAS-PURIFYING CATALYST

(75) Inventors: Satoshi Matsueda, Kakegawa (JP); Akimasa Hirai, Kakegawa (JP); Kenichi Taki, Kakegawa (JP); Yuji Yabuzaki, Kakegawa (JP)

(73) Assignee: Cataler Corporation, Shizouka (JP)

( * ) Notice: Subject to any disclaimer, the term of this patent is extended or adjusted under 35 U.S.C. 154(b) by 0 days.

(21) Appl. No.: 13/301,859

(22) Filed: Nov. 22, 2011

(65) Prior Publication Data
US 2012/0065058 A1 Mar. 15, 2012

Related U.S. Application Data

(63) Continuation of application No. PCT/JP2010/059016, filed on May 27, 2010.

(30) Foreign Application Priority Data

May 27, 2009 (JP) ................................. 2009-127310

(51) Int. Cl.
*B01J 23/00* (2006.01)
*B01J 21/00* (2006.01)
(52) U.S. Cl.
USPC ........... 502/328; 502/327; 502/332; 502/333; 502/334; 502/339; 502/341; 502/355; 502/415; 502/439; 502/527.12; 502/527.13
(58) Field of Classification Search
USPC ......... 502/327, 328, 332–334, 339, 341, 355, 502/415, 439, 527.12, 527.13
See application file for complete search history.

(56) References Cited

U.S. PATENT DOCUMENTS

| 5,597,771 | A | * | 1/1997 | Hu et al. ........................ 502/304 |
| 5,948,723 | A | * | 9/1999 | Sung ............................. 502/303 |
| 6,294,140 | B1 | * | 9/2001 | Mussmann et al. ......... 423/213.5 |
| 6,306,794 | B1 | * | 10/2001 | Suzuki et al. ................. 502/304 |
| 6,348,430 | B1 | * | 2/2002 | Lindner et al. ................ 502/304 |

(Continued)

FOREIGN PATENT DOCUMENTS

| CN | 101293203 A | 10/2008 |
| EP | 0 941 757 A2 | 9/1999 |

(Continued)

OTHER PUBLICATIONS

Notification of Transmittal of Translation of the International Preliminary Report on Patentability (Chapter I or Chapter II), including International Preliminary Report on Patentability and Written Opinion of the International Searching Authority, mailed Dec. 22, 2011 in connection with PCT International Application No. PCT/JP2010/059016, filed May 27, 2010.

(Continued)

*Primary Examiner* — Cam N. Nguyen
(74) *Attorney, Agent, or Firm* — John P. White; Cooper & Dunham LLP

(57) ABSTRACT

An exhaust gas-purifying catalyst according to the present invention includes a substrate, a first catalytic layer facing the substrate and includes at least one precious metal selected from the group consisting of palladium and platinum, and alumina doped with an alkaline-earth metal element, and a second catalytic layer facing the substrate with the first catalytic layer interposed therebetween or intervening between the substrate and the first catalytic layer, the second catalytic layer includes rhodium and alumina doped with the alkaline-earth metal element.

9 Claims, 2 Drawing Sheets

(56) References Cited

U.S. PATENT DOCUMENTS

| | | | |
|---|---|---|---|
| 6,764,665 B2* | 7/2004 | Deeba et al. | 423/239.1 |
| 7,517,510 B2* | 4/2009 | Chen et al. | 423/213.2 |
| 7,550,124 B2* | 6/2009 | Chen et al. | 423/213.2 |
| 7,754,171 B2* | 7/2010 | Chen et al. | 423/213.2 |
| 8,007,750 B2* | 8/2011 | Chen et al. | 423/239.1 |
| 8,066,963 B2* | 11/2011 | Klingmann et al. | 423/213.5 |
| 2002/0048542 A1* | 4/2002 | Deeba et al. | 423/239.1 |
| 2003/0100447 A1* | 5/2003 | Deeba et al. | 502/339 |
| 2008/0044330 A1* | 2/2008 | Chen et al. | 423/213.5 |
| 2008/0045404 A1* | 2/2008 | Han et al. | 502/66 |

FOREIGN PATENT DOCUMENTS

| | | |
|---|---|---|
| EP | 2 368 630 A1 | 9/2011 |
| JP | 11-207183 A | 8/1999 |
| JP | 2001-506177 A | 5/2001 |
| JP | 2008-290065 A | 12/2008 |
| WO | WO 93/17968 A1 | 9/1993 |

OTHER PUBLICATIONS

International Search Report mailed by the International Searching Authority (ISA/JP) on Aug. 10, 2010 in connection with PCT International Application No. PCT/JP2010/059016, filed May 27, 2010.
Written Opinion of the International Searching Authority mailed by the International Searching Authority (ISA/JP) on Aug. 10, 2010 in connection with PCT International Application No. PCT/JP2010/059016, filed May 27, 2010.
Extended European search report, including supplementary search report and European search opinion, issued Jul. 2, 2013 in connection with European patent application No. 10780611.9.
Chinese official action (including English translation thereof) mailed on Apr. 19, 2013 by the Chinese Patent Office, in connection with Chinese Patent Application No. 201080022779.7.

* cited by examiner

US 8,580,706 B2

EXHAUST GAS-PURIFYING CATALYST

CROSS-REFERENCE TO RELATED APPLICATIONS

This application is a Continuation Application of PCT Application No. PCT/JP2010/059016, filed May 27, 2010 and based upon and claiming the benefit of priority from prior Japanese Patent Application No. 2009-127310, filed May 27, 2009, the entire contents of all of which are incorporated herein by reference.

BACKGROUND OF THE INVENTION

1. Field of the Invention

The present invention relates to an exhaust gas-purifying catalyst.

2. Description of the Related Art

Recently, emission controls on automobiles and the like have been strengthened. Therefore, in order to address this issue, various exhaust gas-purifying catalysts for purifying hydrocarbons (HC), carbon monoxide (CO), nitrogen oxides ($NO_X$) and the like in exhaust gas have been developed.

Many exhaust gas-purifying catalysts contain a precious metal as a catalytic metal. The precious metal plays a role in accelerating oxidation reactions of HC and CO and reduction reactions of $NO_X$.

However, the precious metal has a problem that they are susceptible to poisoning by HC in the exhaust gas. When the precious metal is poisoned by HC, $NO_X$ reduction reaction on the precious metal becomes difficult to occur. Therefore, a catalyst comprising the precious metal sometimes shows an insufficient $NO_X$ purification efficiency specifically under a rich atmosphere in which an HC concentration in the exhaust gas is high.

Therefore, in order to suppress this, a technique comprising adding a salt of an alkaline-earth metal element to a catalyst comprising a precious metal has been suggested (see, for example, Jpn. Pat. Appln. KOKAI Publication No. 11-207183). When such a composition is adopted, poisoning of the precious metal by HC is suppressed by the action of the alkaline-earth metal element, whereby exhaust gas purification performances such as an $NO_X$ purification efficiency can be improved to some extent.

However, there is room for further improvement of exhaust gas purification performances of exhaust gas-purifying catalysts.

BRIEF SUMMARY OF THE INVENTION

An object of the present invention is to provide a technique by which excellent exhaust gas purification performances can be achieved.

According to an aspect of the present invention, there is provided an exhaust gas-purifying catalyst comprising: a substrate, a first catalytic layer facing the substrate and comprising at least one precious metal selected from the group consisting of palladium and platinum and alumina doped with an alkaline-earth metal element, a ratio of a total mass of palladium and platinum comprised in the first catalytic layer to a total mass of all precious metals comprised in the first catalytic layer being a first value, the first catalytic layer being rhodium-free or further comprising rhodium such that a ratio of a mass of rhodium comprised in the first catalytic layer to the total mass of all precious metals comprised in the first catalytic layer being a second value, and a ratio of a total mass of all alkaline-earth metal elements comprised in the first catalytic layer to the total mass of all precious metals comprised in the first catalytic layer being a third value, and a second catalytic layer facing the substrate with the first catalytic layer interposed therebetween or intervening between the substrate and the first catalytic layer, the second catalytic layer comprising rhodium and alumina doped with an alkaline-earth metal element, a ratio of a mass of rhodium comprised in the second catalytic layer to a total mass of all precious metals comprised in the second catalytic layer being higher than the second value, the second catalytic layer being palladium-free and platinum-free or further comprising at least one of palladium and platinum such that a ratio of a total mass of palladium and platinum comprised in the precious metals to the total mass of all precious metals comprised in the second catalytic layer being lower than the first value, and a ratio of a total mass of all alkaline-earth metal elements comprised in the second catalytic layer to the total mass of all precious metals comprised in the second catalytic layer being lower than the third value.

DETAILED DESCRIPTION OF THE INVENTION

Figure 1:
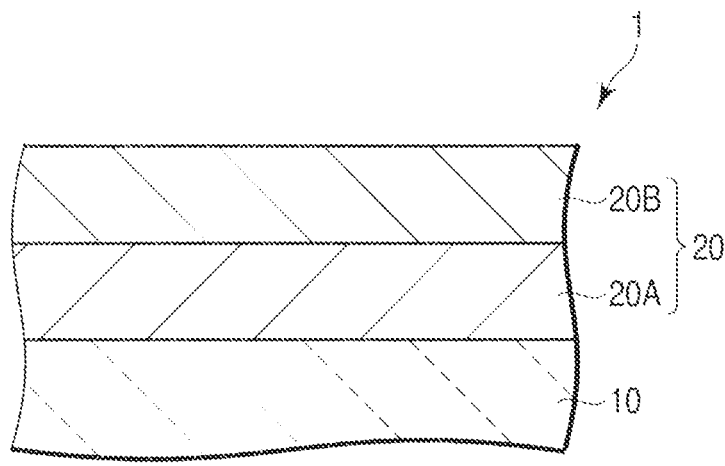
FIG. 1 is a cross-sectional drawing schematically showing the exhaust gas-purifying catalyst according to one embodiment of the present invention.

Hereinafter the embodiments of the present invention are explained with reference to the drawings. Throughout all drawings, constitutional elements that exhibit the same or similar function are provided with the same reference numerals, and overlapped explanations are omitted. Furthermore, as used herein, the "composite oxide" means that a plurality of oxides forms a solid solution rather than that a plurality of oxides is merely mixed physically. In addition, the "alkaline-earth metal" encompasses beryllium and magnesium.

FIG. 1 is a cross-sectional drawing schematically showing the exhaust gas-purifying catalyst according to one embodiment of the present invention.

The exhaust gas-purifying catalyst 1 comprises a substrate 10 and a catalytic layer 20. The catalytic layer 20 comprises a first catalytic layer 20A formed on the substrate 10 and a second catalytic layer 20B formed on the first catalytic layer 20A.

As the substrate 10, for example, a monolith honeycomb type substrate is used. Typically, the substrate is made of a ceramic such as cordierite.

The first catalytic layer 20A comprises at least one precious metal selected from the group consisting of palladium and platinum, and alumina doped with the alkaline-earth metal element.

The first catalytic layer 20A comprises at least one of palladium and platinum as the precious metal. The first catalytic layer 20A may further comprise the precious metal other than palladium and platinum. For example, the first catalytic layer 20A may further comprise rhodium as the precious metal. Typically, the first catalytic layer 20A comprises only at least one of palladium and platinum as the precious metal.

The precious metal comprised in the first catalytic layer 20A is typically supported on the alumina doped with the alkaline-earth metal element. The precious metal plays a role of catalyzing, for example, oxidation reactions of HC and CO and a reduction reaction of $NO_X$.

The alumina doped with the alkaline-earth metal element has a structure in which the alkaline-earth metal element is positioned inside of each alumina particle. The alkaline-earth metal element may substitute for a part of atoms that constitute crystal lattices of the alumina, or may be positioned in voids between these atoms. Alternatively, a part of the alkaline-earth metal element may substitute for a part of the atoms that constitute the crystal lattices of the alumina and another part of the alkaline-earth metal element may be positioned in the voids between these atoms.

In the first catalytic layer 20A, the alkaline-earth metal element doped in alumina plays a role of suppressing HC poisoning of the precious metal comprised in the first catalytic layer 20A. As the alkaline-earth metal element, for example, barium, calcium, strontium, beryllium, magnesium, or a combination of two or more of these is used. Typically, barium is used as the alkaline-earth metal element.

In the first catalytic layer 20A, the amount of the alkaline-earth metal element to be doped in alumina is adjusted to the range of, for example, from 0.1% by mass to 20% by mass, typically the range of from 1% by mass to 10% by mass based on the mass of the alumina. When the amount is too low, suppression of HC poisoning of the precious metal may become insufficient. When the amount is too high, it is possible that the heat resistance of the alumina is decreased, and the precious metal may coagulate easily. As a result, the exhaust gas purification performance of the exhaust gas-purifying catalyst 1 may be decreased.

In the first catalytic layer 20A, the content of the alkaline-earth metal element per unit volume of the substrate 10 is, for example, 0.1 g/L or more, typically 1 g/L or more. The content is, for example, 50 g/L or less, typically 20 g/L or less. When the content is too low or too high, the exhaust gas purification performance of the exhaust gas-purifying catalyst 1 may be reduced.

The second catalytic layer 20B faces the substrate 10 across the first catalytic layer 20A.

The second catalytic layer 20B comprises rhodium and alumina doped with the alkaline-earth metal element.

The second catalytic layer 20B comprises rhodium as a precious metal. The ratio of the mass of rhodium comprised in the second catalytic layer 20B to the total mass of all precious metals comprised in the second catalytic layer 20B is higher than that of the first catalytic layer 20A.

The second catalytic layer 20B may further comprise a precious metal other than rhodium. The second catalytic layer 20B may, for example, further comprise at least one of palladium and platinum as a precious metal. However, the ratio of the total mass of palladium and platinum comprised in the second catalytic layer 20B to the total mass of all precious metals comprised in the second catalytic layer 20B is lower than that of the first catalytic layer 20A.

The second catalytic layer 20B typically comprises only rhodium or only rhodium and platinum as the precious metal.

The precious metal comprised in the second catalytic layer 20B is typically supported on the alumina doped with the alkaline-earth metal element. The precious metal plays a role of catalyzing, for example, oxidation reactions of HC and CO and a reduction reaction of $NO_X$.

In the second catalytic layer 20B, the alkaline-earth metal element doped in alumina plays a role of suppressing HC poisoning of the precious metal comprised in the second catalytic layer 20B. As the alkaline-earth metal element, for example, barium, calcium, strontium, beryllium, magnesium or a combination of two or more of these is used. Typically, barium is used as the alkaline-earth metal element. The alkaline-earth metal element comprised in the second catalytic layer 20B may be identical to or may be different from that comprised in the first catalytic layer 20A.

In the second catalytic layer 20B, the amount of the alkaline-earth metal element to be doped in alumina is adjusted to the range of, for example, 0.1% by mass to 20% by mass, typically the range of from 1% by mass to 10% by mass based on the mass of alumina. When the amount is too low, the suppression of HC poisoning of the precious metal may become insufficient. When the amount is too high, it is possible that the heat resistance of the alumina is decreased, and the precious metal may coagulate easily. As a result, the exhaust gas purification performance of the exhaust gas-purifying catalyst 1 may be decreased.

The ratio of the total mass of all alkaline-earth metal elements comprised in the second catalytic layer 20B to the total mass of all precious metals comprised in the second catalytic layer 20B (hereinafter also referred to as "second mass ratio") is lower than the ratio of the total mass of all alkaline-earth metal elements comprised in the first catalytic layer 20A to the total mass of all precious metals comprised in the first catalytic layer 20A (hereinafter also referred to as "first mass ratio"). By adopting such a constitution, excellent exhaust gas purification performances can be achieved.

The ratio R of the second mass ratio to the first mass ratio is, for example, 0.95 or less, typically 0.9 or less. The ratio R is typically 0.001 or more. When the ratio R is too high or too low, the exhaust gas purification performance of the exhaust gas-purifying catalyst 1 may be reduced.

In the second catalytic layer 20B, the content of the second alkaline-earth metal element per unit volume of the substrate 10 is, for example, 0.05 g/L or more, typically 0.5 g/L or more. The content is, for example, 10 g/L or less, typically 5 g/L or less. When the content is too low or too high, the exhaust gas purification performance of the exhaust gas-purifying catalyst 1 may be reduced.

As described above, in the present embodiment, alumina doped with the alkaline-earth metal element is used as the material for both catalytic layers 20A and 20B. By adopting such a constitution, particularly excellent exhaust gas purification performances can be achieved as compared with, for example, the case where the alkaline-earth metal element is added in salt form. Although the mechanism is not necessarily clear, the present inventors consider as follows.

Namely, when a mixture of alumina and a salt of an alkaline-earth metal element is used as the materials of catalytic layers 20A and 20B, contact of the catalyst metal supported on alumina with the alkaline-earth metal element becomes relatively hard to occur. That is, although a part of the alkaline-earth metal element is in contact with the catalyst metal, the other part of the alkaline-earth metal element does not come into contact with the catalyst metal. The alkaline-earth metal element not being in contact with the catalyst metal does not contribute to suppression of the HC poisoning of the catalyst metal. Therefore, when such alkaline-earth metal element is present in a large amount, improvement of the exhaust gas purification performances of the catalyst may sometimes become difficult.

On the other hand, when the alumina doped with the alkaline-earth metal element is used, the alkaline-earth metal element can be distributed at high uniformity in the structure of the alumina. In this case, the alkaline-earth metal element doped on the alumina and the catalyst metal supported on the alumina are in close proximity with each other. Namely, in this case, the alkaline-earth metal element contacts the catalyst metal more easily than when a mixture of alumina and a salt of an alkaline-earth metal element are used. Therefore, in this case, HC poisoning of the catalyst metal can be suppressed more efficiently. Therefore, by using the alumina doped with the alkaline-earth metal element, excellent exhaust gas purification performance can be achieved.

The alumina doped with the alkaline-earth metal element is prepared, for example, as follows. Namely, at first, a mixed aqueous solution comprising aluminum nitrate, a carbonate of an alkaline-earth metal element and citric acid is prepared. Then, hydrazine is added to this mixed aqueous solution. Thereafter, the reaction system is heated under stirring to give a precipitate. The precipitate is filtered off, and the obtained filtration cake is dried. The obtained solid is then fired. By such means, the alumina doped with the alkaline-earth metal element is obtained.

The uniformity of distribution of the alkaline-earth metal element in each of the first catalytic layer 20A and the second catalytic layer 20B is evaluated as follows.

A method of evaluating the uniformity of distribution of the alkaline-earth metal element in the first catalytic layer 20A will be first described.

First, 175 planes that are obtained by dividing the thickness between the surface of the first catalytic layer 20A and the surface of the first catalytic layer 20A on the side of the substrate 10 into 175 equivalent parts are considered. Then, 175 intersection points of these 175 planes and a straight line perpendicular to the main surface of the first catalytic layer 20A are considered. Hereinafter, these 175 intersection points are referred to as points $P_i$ (i=1, 2, . . . , 175; hereinafter the same).

Then, using an electron beam microanalyzer (EPMA) on each of these 175 points $P_i$, the intensity $I_{Al,i}$ of a characteristic X-ray emitted by aluminum and the intensity $I_{AE,i}$ of characteristic X-ray emitted by the alkaline-earth metal element are measured. Furthermore, the correlation coefficient $\rho_{Al,AE}$ given by the following formula (1) is obtained based on these measurement values.

$$\rho_{Al,AE} = \frac{C_{Al,AE}}{\sigma_{Al}\sigma_{AE}} \quad (1)$$

In the above-mentioned formula (1), $C_{Al,AE}$ is a covariance of the intensity $I_{Al,i}$ and the intensity $I_{AE,i}$, $\sigma_{Al}$ is the standard deviation of the intensity $I_{Al,i}$, and $\sigma_{AE}$ is the standard deviation of the intensity $I_{AE,i}$. The covariance $C_{Al,AE}$ and the standard deviations $\sigma_{Al}$ and $\sigma_{AE}$ are given by the following formulae (2) to (4), respectively.

$$C_{Al,AE} = \frac{1}{175}\sum_{i=1}^{175}(I_{Al,i} - I_{Al,av})(I_{AE,i} - I_{AE,av}) \quad (2)$$

$$\sigma_{Al} = \sqrt{\frac{1}{175}\sum_{i=1}^{175}(I_{Al,i} - I_{Al,av})^2} \quad (3)$$

$$\sigma_{AE} = \sqrt{\frac{1}{175}\sum_{i=1}^{175}(I_{AE,i} - I_{AE,av})^2} \quad (4)$$

In each of the above-mentioned formulae, $I_{Al,av}$ is the arithmetic average value of the intensity $I_{Al,i}$ given by the following formula (5), and $I_{AE,av}$ is the arithmetic average value of the intensity $I_{AE,i}$ given by the following formula (6).

$$I_{Al,av} = \frac{1}{175}\sum_{i=1}^{175} I_{Al,i} \quad (5)$$

$$I_{AE,av} = \frac{1}{175}\sum_{i=1}^{175} I_{AE,i} \quad (6)$$

The correlation coefficient $\rho_{Al,AE}$ represented by the formula (1) serves as an index that shows the correlation between the distribution of aluminum and the distribution of the alkaline-earth metal element in the first catalytic layer 20A. Namely, when the alkaline-earth metal element is distributed relatively uniformly in the first catalytic layer 20A, the correlation coefficient $\rho_{Al,AE}$ is a large positive value of 1 or less. On the other hand, when the alkaline-earth metal element is distributed relatively ununiformly the first catalytic layer 20A, the correlation coefficient $\rho_{Al,AE}$ is a small value close to 0.

The uniformity of distribution of the alkaline-earth metal element in the second catalytic layer 20B can be similarly evaluated.

Specifically, first, 175 planes that are obtained by dividing the thickness between the surface of the second catalytic layer 20B and the surface of the second catalytic layer 20B on the side of the first catalytic layer 20A into 175 equivalent parts are considered. Then, on each of 175 intersection points $P_j$ (j=1, 2, . . . , 175) of these 175 planes and a straight line perpendicular to the main surface of the second catalytic layer 20B are measured by EPMA. Then, the correlation coefficient $\rho_{Al,AE}$ in the second catalytic layer 20B is calculated similarly to the first catalytic layer 20.

The correlation coefficient $\rho_{Al,AE}$ thus obtained serves as an index that shows the correlation between the distribution of aluminum and the distribution of the alkaline-earth metal element the second catalytic layer 20B. Namely, when the alkaline-earth metal element is distributed relatively uniformly in the second catalytic layer 20B, the correlation coefficient $\rho_{Al,AE}$ is a large positive value of 1 or less. On the other hand, when the alkaline-earth metal element is distributed relatively ununiformly the second catalytic layer 20B, the correlation coefficient $\rho_{Al,AE}$ is a small positive value close to 0.

Thus, by using the correlation coefficient $\rho_{Al,AE}$, the uniformity of distribution of the alkaline-earth metal element in catalytic layers 20A and 20B can be evaluated. In the exhaust gas-purifying catalyst 1, the correlation coefficient $\rho_{Al,AE}$ of catalytic layers 20A and 20B is a large positive value of 1 or less. That is, in the case of the exhaust gas-purifying catalyst 1, the alkaline-earth metal element is relatively uniformly distributed in both of catalytic layers 20A and 20B.

In the exhaust gas-purifying catalyst 1, the correlation coefficient $\rho_{Al,AE}$ of the first catalytic layer 20A is preferably 0.61 or more, more preferably 0.70 or more, still more preferably 0.77 or more. The correlation coefficient $\rho_{Al,AE}$ of the second catalytic layer 20B is preferably 0.61 or more, more preferably 0.70 or more, still more preferably 0.77 or more.

At least one of catalytic layer 20A and catalytic layer 20B may further comprise an oxygen storage material. As the oxygen storage material, for example, cerium oxide, zirconium oxide, or a composite oxide thereof is used. Alternatively, rare earth oxides such as praseodymium oxide, transition metal oxides such as iron oxide and manganese oxide, or composite oxides thereof may also be used as the oxygen storage material. Alternatively, mixtures of the above-mentioned compound may also be used as the oxygen storage material. Typically, a composite oxide of cerium oxide and zirconium oxide is used as the oxygen storage material.

At least one of catalytic layer 20A and catalytic layer 20B may further comprise a rare earth element. The rare earth element has a function of improving the $NO_X$ purification performance of the exhaust gas-purifying catalyst 1 without decreasing the HC purification performance thereof. The rare earth element also has a function of improving the thermal resistance of the exhaust gas-purifying catalyst 1. Further, the rare earth element has a function of suppressing a decrease in oxygen storage performance of the oxygen storage materials. As the rare earth element, for example, neodymium, lanthanum, praseodymium or yttrium can be used. These rare earth elements can be introduced, for example, as constituent components of the oxygen storage materials.

At least one of catalytic layer 20A and catalytic layer 20B may further comprise zeolite. Zeolite has a high specific surface area and is excellent in performance of adsorbing HC in exhaust gas. Therefore, the HC purification performance of the exhaust gas-purifying catalyst 1 can further be improved by incorporating zeolite.

At least one of catalytic layer 20A and catalytic layer 20B may further comprise a binder. The binder plays a rule to improve the durability of the exhaust gas-purifying catalyst 1 by strengthening the bonding between a plurality of particles that constitute at least one of catalytic layer 20A and catalytic layer 20B. As the binder, for example, an alumina sol, a titanic sol or a silica sol is used.

The exhaust gas-purifying catalyst 1 may further comprise additional layer besides catalytic layers 20A and 20B. By employing such embodiments, various types of performance to be required for the exhaust gas-purifying catalyst 1 can be adjusted.

The exhaust gas-purifying catalyst 1 is produced, for example, as follows.

First, a slurry comprising at least one precious metal selected from the group consisting of palladium and platinum, and alumina doped with the alkaline-earth metal element (hereinafter also referred to as "first slurry") is prepared. The first slurry is applied to a substrate, which is subjected to drying and firing. Thus, the first catalytic layer 20A is obtained.

When palladium is used as a precious metal, as a material for the above-mentioned first slurry, for example, a palladium salt such as palladium nitrate or a palladium complex is used. When platinum is used as a precious metal, for example, a platinum complex such as dinitrodiamine platinum nitrate or platinum salt is used as a material for the above-mentioned first slurry. When both palladium and platinum are used as the first catalyst metal, for example, a mixture of a palladium salt such as palladium nitrate or a palladium complex and a platinum complex such as dinitrodiamine platinum nitrate or a platinum salt is used as the material of the above-mentioned first slurry.

Next, a slurry comprising rhodium and alumina doped with the alkaline-earth metal element (hereinafter also referred to as "second slurry") is prepared. The second slurry is applied to the first catalytic layer 20A, which is subjected to drying and firing. Thus, the second catalytic layer 20B is obtained.

As the material of the second slurry, for example, a rhodium salt such as rhodium nitrate or a rhodium complex is used. When both rhodium and platinum are used as a precious metal comprised in the second catalytic layer 20B, for example, a mixture of a rhodium salt such as rhodium nitrate or a rhodium complex and a platinum complex such as dinitrodiamine platinum nitrate or a platinum salt is used as the material of the above-mentioned second slurry.

The exhaust gas-purifying catalyst 1 is obtained as described above.

At least one of the first slurry and the second slurry is preferably further comprise citric acid. By using citric acid, the correlation coefficient $\rho_{Al,AE}$ in at least one of catalytic layer 20A and catalytic layer 20B can be further improved. Although the reason is not necessarily clear, the present inventors consider as follows. Namely, the present inventors consider that citric acid stabilized a molecular structure of alumina, thereby aggregation of the alkaline earth metal is further suppressed.

Figure 2:
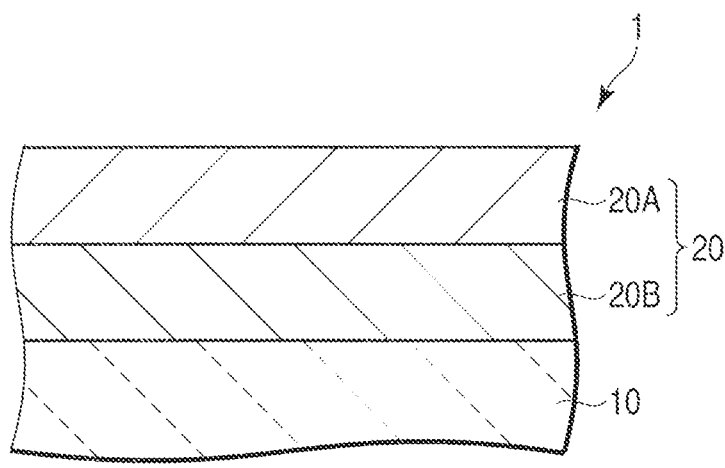
FIG. 2 is a cross-sectional drawing schematically showing the exhaust gas-purifying catalyst according to another embodiment of the present invention.

FIG. 2 is a cross-sectional drawing schematically showing an exhaust gas-purifying catalyst according to another embodiment. The exhaust gas-purifying catalyst 1 shown in FIG. 2 has a constitution similar to that of the exhaust gas-purifying catalyst which has been described with reference to FIG. 1, except that a stacking sequence of the first catalytic layer 20A and the second catalytic layer 20B is reversed.

The present inventors have found that the exhaust gas-purifying catalyst 1 with the constitution shown in FIG. 1 is useful for, particularly purification of $NO_X$. The present inventors have also found that the exhaust gas-purifying catalyst 1 with the constitution shown in FIG. 2 is useful for, particularly purification of HC. Consequently, optimal exhaust gas purification performance according to the application of the exhaust gas-purifying catalyst 1 can be achieved by changing the stacking sequence of catalytic layers 20A and 20B.

EXAMPLES

Example 1

Preparation of Catalyst C1

Alumina doped with 10% by mass of barium was prepared. Hereinafter, this is referred to as "Ba alumina BA1".

A composite oxide of cerium oxide and zirconium oxide was prepared. In the composite oxide, the molar ratio of the cerium element to zirconium element was 7:3. Hereinafter, this composite oxide is referred to as "CZ oxide".

A monolith honeycomb substrate made of cordierite having a entire length of 100 mm, a volume of 1.0 L, and a cell number of 900 per square inch was prepared (1 inch=2.54 cm).

50 g of Ba alumina BA1, 50 g of CZ oxide, an aqueous solution of palladium nitrate containing 0.5 g of palladium, and 2 g of citric acid were mixed to prepare a slurry. Hereinafter, the slurry is referred to as "slurry S1".

The slurry S1 was then applied to the above-mentioned substrate. This was then dried at 250° C. for 1 hour, followed by firing at 500° C. for 1 hour. Thus, the first catalytic layer 20A of which the raw material was the slurry S1 was formed on the substrate.

Alumina doped with 1.0% by mass of barium was prepared. Hereinafter, this is referred to as "Ba alumina BA2".

A composite oxide of zirconium oxide and cerium oxide was prepared. The molar ratio of zirconium element to cerium element in the composite oxide was 3/7. Hereinafter, the composite oxide is referred to as "ZC oxide".

50 g of Ba alumina BA2, 50 g of ZC oxide, an aqueous solution of rhodium nitrate containing 0.5 g of rhodium, and 2 g of citric acid were mixed to prepare a slurry. Hereinafter, the slurry is referred to as "slurry S2".

The slurry S2 was then applied to the first catalytic layer 20A of which the raw material was the slurry S1. This was then dried at 250° C. for 1 hour, followed by firing at 500° C. for 1 hour. Thus, the second catalytic layer 20B of which the raw material was the slurry S2 was formed on the first catalytic layer 20A of which the raw material was the slurry S1.

Thus, an exhaust gas-purifying catalyst was produced. Hereinafter, the catalyst is referred to as "catalyst C1".

Example 2

Production of Catalyst C2

Comparative Example 45 g of alumina, 50 g of CZ oxide, 8.5 g of barium sulfate, an aqueous solution of palladium nitrate containing 0.5 g of palladium, and 2 g of citric acid were mixed to prepare a slurry. Hereinafter, the slurry is referred to as "slurry S3".

Then, an exhaust gas-purifying catalyst was produced in a similar manner to that for the catalyst C1, except that the slurry S3 was used instead of the slurry S1. Hereinafter, the catalyst is referred to as "catalyst C2".

In the catalyst C2, the ratio of the mass of barium to the total mass of the mass of alumina and the mass of barium in the first catalytic layer 20A was 10% by mass.

Example 3

Production of Catalyst C3

Comparative Example 49.5 g of alumina, 50 g of ZC oxide, 0.93 g of barium acetate, an aqueous solution of rhodium nitrate containing 0.5 g of rhodium, and 2 g of citric acid were mixed to prepare a slurry. Hereinafter, the slurry is referred to as "slurry S4".

Then, an exhaust gas-purifying catalyst was produced in a similar manner to that for the catalyst C1, except that the slurry S4 was used instead of the slurry S2. Hereinafter, the catalyst is referred to as "catalyst C3".

In the catalyst C3, the ratio of the mass of barium to the total mass of the mass of alumina and the mass of barium in the second catalytic layer 20B was 1.0% by mass.

Example 4

Production of Catalyst C4

Comparative Example 49.5 g of alumina, 50 g of ZC oxide, 0.85 g of barium sulfate, an aqueous solution of rhodium nitrate containing 0.5 g of rhodium, and 2 g of citric acid were mixed to prepare a slurry. Hereinafter, the slurry is referred to as "slurry S5".

Then, an exhaust gas-purifying catalyst was produced in a similar manner to that for the catalyst C1, except that the slurry S3 was used instead of the slurry S1 and the slurry S5 was used instead of the slurry S2. Hereinafter, the catalyst is referred to as "catalyst C4".

In the catalyst C4, the ratio of the mass of barium to the total mass of the mass of alumina and the mass of barium in the first catalytic layer 20A was 10% by mass. The ratio of the mass of barium to the total mass of the mass of alumina and the mass of barium in the second catalytic layer 20B was 1.0% by mass.

Data about the catalysts C1 to C4 is summarized in Table 1 below. In Table 1 and the following tables, the column "the amount of the precious metal" describes the mass of the precious metal per unit volume of the substrate (g/L). The column "the introduction form" describes the induction form of the alkaline-earth metal element. The column "the amount of the alkaline-earth metal element" describes the mass of the alkaline-earth metal element per unit volume of the substrate (g/L). The column "the mass ratio" described the mass ratio of the alkaline-earth metal element to the precious metal.

TABLE 1

| Catalyst | Catalyst layer | Precious metal | Amount of precious metal (g/L) | Oxygen storage material | Alkali earth metal element | Introduction form | Amount of alkali earth metal element (g/L) | Mass ratio | Correlation coefficient $\rho_{Al,AE}$ | Emissions NMHC (g/km) | CO (g/km) | $NO_X$ (g/km) |
|---|---|---|---|---|---|---|---|---|---|---|---|---|
| C1 | Upper layer | Rh | 0.5 | ZC | Ba | BA2 | 0.5 | 1 | 0.80 | 0.014 | 0.100 | 0.007 |
|  | Lower layer | Pd | 0.5 | CZ | Ba | BA1 | 5 | 10 | 0.82 |  |  |  |
| C2 (Comparative Example) | Upper layer | Rh | 0.5 | ZC | Ba | BA2 | 0.5 | 1 | 0.80 | 0.070 | 0.251 | 0.125 |
|  | Lower layer | Pd | 0.5 | CZ | Ba | Sulfate Ba | 5 | 10 | 0.58 |  |  |  |
| C3 (Comparative Example) | Upper layer | Rh | 0.5 | ZC | Ba | Acetate Ba | 0.5 | 1 | 0.54 | 0.068 | 0.250 | 0.126 |
|  | Lower layer | Pd | 0.5 | CZ | Ba | BA1 | 5 | 10 | 0.83 |  |  |  |
| C4 (Comparative Example) | Upper layer | Rh | 0.5 | ZC | Ba | Sulfate Ba | 0.5 | 1 | 0.56 | 0.076 | 0.260 | 0.131 |
|  | Lower layer | Pd | 0.5 | CZ | Ba | Sulfate Ba | 5 | 10 | 0.58 |  |  |  |

<Evaluation of Dispersion Property of Alkaline-Earth Metal Element in Catalytic Layer (1)>

The correlation coefficient $\rho_{Al,AE}$ (AE=Ba) possessed by the catalyst C1 was calculated as follows. The correlation coefficient $\rho_{Al,Ba}$ each of the first catalytic layer 20A and the second catalytic layer 20B was calculated.

Specifically, EPMA measurement was performed on each of the 175 points $P_i$ (i=1, 2, . . . , 175) that were determined as for the first catalytic layer 20A as mentioned previously. Similarly, EPMA measurement was performed on each of the 175 points $P_j$ (j=1, 2, ..., 175) that were determined as for the second catalytic layer 20B as mentioned previously. Then, based on the above-mentioned formula, a correlation coefficient $\rho_{Al,Ba}$ each of the first catalytic layer 20A and the second catalytic layer 20B possessed by the catalyst C1 was calculated.

Then, the correlation coefficient $\rho_{Al,Ba}$ each of the first catalytic layer 20A and the second catalytic layer 20B possessed by the catalysts C2 to C4, was calculated in a similar manner to that for the catalyst C1. The results are shown in FIG. 1.

As shown in Table 1, the correlation coefficients $\rho_{Al,Ba}$ each of the catalytic layers 20A and 20B possessed by the catalyst C1, is a large positive value close to 1. Namely, in the case of the catalyst C1, it was found that the alkaline-earth metal element was relatively uniformly distributed in the both catalytic layers 20A and 20B. On the other hand, the correlation coefficient $\rho_{Al,Ba}$ of at least one of the catalytic layer 20A and the catalytic layer 20B possessed by the catalysts C2 to C4 showed a relatively small value. Namely, in the case of the catalysts C2 to C4, it was found that the alkaline-earth metal element was relatively ununiformly distributed in at least one of the catalytic layer 20A and the catalytic layer 20B.

<Evaluation of Exhaust Gas Purification Performance (1)>

The exhaust gas purification performance was evaluated for each of the catalysts C1 to C4.

First, an endurance test corresponding to driving of 60,000 km was performed for each of the catalysts C1 to C4. Then, these were mounted on real vehicles each having an engine of 1.0 L displacement. Subsequently, the real vehicles were each driven on JC08C mode (JC08 mode by cold start) and JC08H mode (JC08 mode by hot start), and the emissions of non-methane hydrocarbons (NMHC), CO and $NO_X$ in each mode were measured. Then, the emissions obtained in each mode were substituted into the following formula, and a combined value of the emissions of NMHC, CO and $NO_X$ by JC08 mode was obtained.

$$E = 0.25 \times E_C + 0.75 \times E_H \quad (7)$$

In the formula, E is the combined value of the emissions of the respective exhaust gases by JC08 mode, $E_C$ is the measurement value of the emission of each exhaust gas by JC08C mode, $E_H$ is the measurement value of the emission of each exhaust gas by JC08H mode. The combined values of the emissions of the respective exhaust gases obtained as above are shown in the above-mentioned Table 1.

As is apparent from the results shown in Table 1, the catalyst C1 had more excellent HC, CO, and $NO_X$ purification performance as compared to that of the catalysts C2 to C4. Namely, it is found that excellent exhaust gas purification performance can be achieved by using alumina doped with the alkaline-earth metal element in both of the first catalytic layer 20A and the second catalytic layer 20B.

Example 5

Preparation of Catalyst C5

An exhaust gas-purifying catalyst was produced in a similar manner to that for the catalyst C1, except that the slurry S2 was used instead of the slurry S1 as a material of the first catalytic layer 20A and the slurry S1 was used instead of the slurry S2 as a material of the second catalytic layer 20B. Hereinafter, the catalyst is referred to as "catalyst C5".

Example 6

Preparation of Catalyst C6

A slurry was prepared in a similar manner to that for the slurry S1, except that a dinitrodiamine platinum nitrate solution containing 0.5 g of platinum was used instead of the palladium nitrate solution containing 0.5 g of palladium. Hereinafter, the slurry is referred to as "slurry S6".

An exhaust gas-purifying catalyst was produced in a similar manner to that for the catalyst C1, except that the slurry S6 was used instead of the slurry S1. Hereinafter, the catalyst is referred to as "catalyst C6".

Example 7

Preparation of Catalyst C7

A slurry was prepared in a similar manner to that for the slurry S1, except that a mixed solution of a palladium nitrate solution containing 0.25 g of palladium and a dinitrodiamine platinum nitrate solution containing 0.25 g of platinum was used instead of the palladium nitrate solution containing 0.5 g of palladium. Hereinafter, the slurry is referred to as "slurry S7".

An exhaust gas-purifying catalyst was produced in a similar manner to that for the catalyst C1, except that the slurry S7 was used instead of the slurry S1. Hereinafter, the catalyst is referred to as "catalyst C7".

Example 8

Preparation of Catalyst C8

A slurry was prepared in a similar manner to that for the slurry S2, except that a mixed solution of a rhodium nitrate solution containing 0.25 g of rhodium and a dinitrodiamine platinum nitrate solution containing 0.25 g of platinum was used instead of the rhodium nitrate solution containing 0.5 g of rhodium. Hereinafter, the slurry is referred to as "slurry S8".

An exhaust gas-purifying catalyst was produced in a similar manner to that for the catalyst C1, except that the slurry S8 was used instead of the slurry S2. Hereinafter, the catalyst is referred to as "catalyst C8".

Example 9

Preparation of Catalyst C9

Alumina doped with 20% by mass of barium was prepared. Hereinafter, this is referred to as "Ba alumina BA3".

A slurry was prepared in a similar manner to that for the slurry S1, except that 250 g of Ba alumina BA3 was used instead of 50 g of Ba alumina BA1. Hereinafter, the slurry is referred to as "slurry S9".

Alumina doped with 0.1% by mass of barium was prepared. Hereinafter, this is referred to as "Ba alumina BA4".

A slurry was prepared in a similar manner to that for the slurry S2, except that 50 g of Ba alumina BA4 was used instead of 50 g of Ba alumina BA2. Hereinafter, the slurry is referred to as "slurry S10".

An exhaust gas-purifying catalyst was produced in a similar manner to that for the catalyst C1, except that the slurry S9 was used instead of slurry S1 and the slurry S10 was used instead of the slurry S2. Hereinafter, the catalyst is referred to as "catalyst C9".

Example 10

Preparation of Catalyst C10

A slurry was prepared in a similar manner to that for slurry S1, except that 50 g of Ba alumina BA3 was used instead of 50 g of Ba alumina BA1. Hereinafter, the slurry is referred to as "slurry S11".

Alumina doped with 18% by mass of barium was prepared. Hereinafter, this is referred to as "Ba alumina BA5".

A slurry was prepared in a similar manner to that for the slurry S2, except that 50 g of Ba alumina BA5 was used instead of 50 g of Ba alumina BA2. Hereinafter, the slurry is referred to as "slurry S12".

An exhaust gas-purifying catalyst was produced in a similar manner to that for the catalyst C1, except that the slurry S11 was used instead of slurry S1 and the slurry S12 was used instead of the slurry S2. Hereinafter, the catalyst is referred to as "catalyst C10".

Example 11

Preparation of Catalyst C11

An exhaust gas-purifying catalyst was produced in a similar manner to that for the catalyst C10, except that the slurry S2 was used instead of the slurry S12. Hereinafter, the catalyst is referred to as "catalyst C11".

Example 12

Preparation of Catalyst C12

A slurry was prepared in a similar manner to that for the slurry S2, except that 50 g of Ba alumina BA1 was used instead of 50 g of Ba alumina BA2. Hereinafter, the slurry is referred to as "slurry S13".

An exhaust gas-purifying catalyst was produced in a similar manner to that for the catalyst C10, except that the slurry S13 was used instead of the slurry S12. Hereinafter, the catalyst is referred to as "catalyst C12".

Example 13

Preparation of Catalyst C13

Alumina doped with 21% by mass of barium was prepared. Hereinafter, this is referred to as "Ba alumina BA6".

A slurry was prepared in a similar manner to that for the slurry S1, except that 250 g of Ba alumina BA6 was used instead of 50 g of Ba alumina BA1. Hereinafter, the slurry is referred to as "slurry S14".

Alumina doped with 0.05% by mass of barium was prepared. Hereinafter, this is referred to as "Ba alumina BA7".

A slurry was prepared in a similar manner to that for the slurry S2, except that 50 g of Ba alumina BA7 was used instead of 50 g of Ba alumina BA2. Hereinafter, the slurry is referred to as "slurry S15".

An exhaust gas-purifying catalyst was produced in a similar manner to that for the catalyst C1, except that the slurry S14 was used instead of slurry S1 and the slurry S15 was used instead of the slurry S2. Hereinafter, the catalyst is referred to as "catalyst C13".

Example 14

Preparation of Catalyst C14

Alumina doped with 10% by mass of strontium was prepared. Hereinafter, this is referred to as "Sr alumina SA1".

A slurry was prepared in a similar manner to that for the slurry S1, except that 50 g of Sr alumina SA1 was used instead of 50 g of Ba alumina BA1. Hereinafter, the slurry is referred to as "slurry S16".

Alumina doped with 1.0% by mass of strontium was prepared. Hereinafter, this is referred to as "Sr alumina SA2".

A slurry was prepared in a similar manner to that for the slurry S2, except that 50 g of Sr alumina SA2 was used instead of 50 g of Ba alumina BA2. Hereinafter, the slurry is referred to as "slurry S17".

An exhaust gas-purifying catalyst was produced in a similar manner to that for the catalyst C1, except that the slurry S16 was used instead of slurry S1 and the slurry S17 was used instead of the slurry S2. Hereinafter, the catalyst is referred to as "catalyst C14".

Example 15

Preparation of Catalyst C15

Alumina doped with 10% by mass of calcium was prepared. Hereinafter, this is referred to as "Ca alumina CA1".

A slurry was prepared in a similar manner to that for the slurry S1, except that 50 g of Ca alumina CA1 was used instead of 50 g of Ba alumina BA1. Hereinafter, the slurry is referred to as "slurry S18".

Alumina doped with 1.0% by mass of calcium was prepared. Hereinafter, this is referred to as "Ca alumina CA2".

A slurry was prepared in a similar manner to that for the slurry S2, except that 50 g of Ca alumina CA2 was used instead of 50 g of Ba alumina BA2. Hereinafter, the slurry is referred to as "slurry S19".

An exhaust gas-purifying catalyst was produced in a similar manner to that for the catalyst C1, except that the slurry S18 was used instead of slurry S1 and the slurry S19 was used instead of the slurry S2. Hereinafter, the catalyst is referred to as "catalyst C15".

Example 16

Preparation of Catalyst C16

Alumina doped with 10% by mass of magnesium was prepared. Hereinafter, this is referred to as "Mg alumina MA1".

A slurry was prepared in a similar manner to that for the slurry S1, except that 50 g of Mg alumina MA1 was used instead of 50 g of Ba alumina BA1. Hereinafter, the slurry is referred to as "slurry S20".

Alumina doped with 1.0% by mass of magnesium was prepared. Hereinafter, this is referred to as "Mg alumina MA2".

A slurry was prepared in a similar manner to that for the slurry S2, except that 50 g of Mg alumina MA2 was used instead of 50 g of Ba alumina BA2. Hereinafter, the slurry is referred to as "slurry S21".

An exhaust gas-purifying catalyst was produced in a similar manner to that for the catalyst C1, except that the slurry S20 was used instead of slurry S1 and the slurry S21 was used instead of the slurry S2. Hereinafter, the catalyst is referred to as "catalyst C16".

Example 17

Preparation of Catalyst C17

A composite oxide of cerium oxide, zirconium oxide, yttrium oxide, and praseodymium oxide was prepared. The molar ratio of the cerium element, zirconium element, yttrium element, and praseodymium element in the composite oxide was 6:2:1:1. Hereinafter, the composite oxide is referred to as "CZYP oxide".

A slurry was prepared in a similar manner to that for the slurry S1, except that 50 g of CZYP oxide was used instead of 50 g of CZ oxide. Hereinafter, the slurry is referred to as "slurry S22".

A composite oxide of zirconium oxide, cerium e, lanthanum oxide, and neodymium oxide was prepared. The molar ratio of the zirconium element, cerium element, lanthanum element, and neodymium element in the composite oxide was 7:1:1:1. Hereinafter, the composite oxide is referred to as "ZCLN oxide".

A slurry was prepared in a similar manner to that for slurry S2, except that 50 g of ZCLN oxide was used instead of 50 g of ZC oxide. Hereinafter, the slurry is referred to as "slurry S23".

An exhaust gas-purifying catalyst was produced in a similar manner to that for the catalyst C1, except that the slurry S22 was used instead of slurry S1 and the slurry S23 was used instead of the slurry S2. Hereinafter, the catalyst is referred to as "catalyst C17".

Example 18

Preparation of Catalyst C18

Comparative Example

Alumina doped with 22% by mass of barium was prepared. Hereinafter, this is referred to as "Ba alumina BA8".

A slurry was prepared in a similar manner to that for the slurry S1, except that 50 g of Ba alumina BA8 was used instead of 50 g of Ba alumina BA1. Hereinafter, the slurry is referred to as "slurry S24".

Additionally, a slurry was prepared in a similar manner to that for the slurry S2, except that 50 g of Ba alumina BA8 was used instead of 50 g of Ba alumina BA2. Hereinafter, the slurry is referred to as "slurry S25".

An exhaust gas-purifying catalyst was produced in a similar manner to that for the catalyst C1, except that the slurry S24 was used instead of slurry S1 and the slurry S25 was used instead of the slurry S2. Hereinafter, the slurry is referred to as "catalyst C18".

Example 19

Preparation of Catalyst C19

Comparative Example

Alumina doped with 23% by mass of barium was prepared. Hereinafter, this is referred to as "Ba alumina BA9".

A slurry was prepared in a similar manner to that for the slurry S2, except that 50 g of Ba alumina BA9 was used instead of 50 g of Ba alumina BA2. Hereinafter, the slurry is referred to as "slurry S26".

An exhaust gas-purifying catalyst was produced in a similar manner to that for the catalyst C18, except that the slurry S26 was used instead of the slurry S25 as a material for the second catalytic layer 20B. Hereinafter, the catalyst is referred to as "catalyst C19".

Example 20

Preparation of Catalyst C20

A slurry was prepared in a similar manner to that for the slurry S1, except that citric acid was not added. Hereinafter, the slurry is referred to as "slurry S27".

A slurry was prepared in a similar manner to that for the slurry S2, except that citric acid was not added. Hereinafter, the slurry is referred to as "slurry S28".

An exhaust gas-purifying catalyst was produced in a similar manner to that for the catalyst C1, except that the slurry S27 was used instead of slurry S1 and the slurry S28 was used instead of the slurry S2. Hereinafter, the catalyst is referred to as "catalyst C20".

Data about the catalysts C1 and C5 to C20 is summarized in Tables 2 to 6 below.

TABLE 2

| Catalyst | Catalyst layer | Precious metal | Amount of precious metal (g/L) | Oxygen storage material | Alkali earth metal element | Introduction form | Amount of alkali earth metal element (g/L) | Mass ratio | Ratio R | Emissions NMHC (g/km) | CO (g/km) | $NO_X$ (g/km) |
|---|---|---|---|---|---|---|---|---|---|---|---|---|
| C1 | Upper layer | Rh | 0.5 | ZC | Ba | BA2 | 0.5 | 1 | 0.1 | 0.014 | 0.100 | 0.007 |
|  | Lower layer | Pd | 0.5 | CZ | Ba | BA1 | 5 | 10 |  |  |  |  |
| C5 | Upper layer | Pd | 0.5 | CZ | Ba | BA1 | 5 | 10 | 0.1 | 0.012 | 0.103 | 0.009 |
|  | Lower layer | Rh | 0.5 | ZC | Ba | BA2 | 0.5 | 1 |  |  |  |  |
| C6 | Upper layer | Rh | 0.5 | ZC | Ba | BA2 | 0.5 | 1 | 0.1 | 0.018 | 0.123 | 0.016 |
|  | Lower layer | Pt | 0.5 | CZ | Ba | BA1 | 5 | 10 |  |  |  |  |
| C7 | Upper layer | Rh | 0.5 | ZC | Ba | BA2 | 0.5 | 1 | 0.1 | 0.016 | 0.096 | 0.009 |
|  | Lower layer | Pd, Pt | 0.25, 0.25 | CZ | Ba | BA1 | 5 | 10 |  |  |  |  |
| C8 | Upper layer | Rh, Pt | 0.25, 0.25 | ZC | Ba | BA2 | 0.5 | 1 | 0.1 | 0.016 | 0.117 | 0.008 |
|  | Lower layer | Pd | 0.5 | CZ | Ba | BA1 | 5 | 10 |  |  |  |  |

TABLE 3

| Catalyst | Catalyst layer | Precious metal | Amount of precious metal (g/L) | Oxygen storage material | Alkali earth metal element | Introduction form | Amount of alkali earth metal element (g/L) | Mass ratio | Ratio R | NMHC (g/km) | CO (g/km) | NO$_X$ (g/km) |
|---|---|---|---|---|---|---|---|---|---|---|---|---|
| C9 | Upper layer | Rh | 0.5 | ZC | Ba | BA4 | 0.05 | 0.1 | 0.001 | 0.017 | 0.108 | 0.010 |
|  | Lower layer | Pd | 0.5 | CZ | Ba | BA3 | 50 | 100 |  |  |  |  |
| C10 | Upper layer | Rh | 0.5 | ZC | Ba | BA5 | 9 | 18 | 0.9 | 0.024 | 0.124 | 0.013 |
|  | Lower layer | Pd | 0.5 | CZ | Ba | BA3 | 10 | 20 |  |  |  |  |
| C11 | Upper layer | Rh | 0.5 | ZC | Ba | BA2 | 0.5 | 1 | 0.05 | 0.014 | 0.101 | 0.007 |
|  | Lower layer | Pd | 0.5 | CZ | Ba | BA3 | 10 | 20 |  |  |  |  |
| C12 | Upper layer | Rh | 0.5 | ZC | Ba | BA1 | 5 | 10 | 0.5 | 0.016 | 0.109 | 0.006 |
|  | Lower layer | Pd | 0.5 | CZ | Ba | BA3 | 10 | 20 |  |  |  |  |
| C13 | Upper layer | Rh | 0.5 | ZC | Ba | BA7 | 0.025 | 0.05 | 0.00048 | 0.018 | 0.128 | 0.025 |
|  | Lower layer | Pd | 0.5 | CZ | Ba | BA6 | 52.5 | 105 |  |  |  |  |

TABLE 4

| Catalyst | Catalyst layer | Precious metal | Amount of precious metal (g/L) | Oxygen storage material | Alkali earth metal element | Introduction form | Amount of alkali earth metal element (g/L) | Mass ratio | Ratio R | NMHC (g/km) | CO (g/km) | NO$_X$ (g/km) |
|---|---|---|---|---|---|---|---|---|---|---|---|---|
| C14 | Upper layer | Rh | 0.5 | ZC | Sr | SA2 | 0.5 | 1 | 0.1 | 0.015 | 0.101 | 0.009 |
|  | Lower layer | Pd | 0.5 | CZ | Sr | SA1 | 5.0 | 10 |  |  |  |  |
| C15 | Upper layer | Rh | 0.5 | ZC | Ca | CA2 | 0.5 | 1 | 0.1 | 0.017 | 0.118 | 0.014 |
|  | Lower layer | Pd | 0.5 | CZ | Ca | CA1 | 5.0 | 10 |  |  |  |  |
| C16 | Upper layer | Rh | 0.5 | ZC | Mg | MA2 | 0.5 | 1 | 0.1 | 0.017 | 0.120 | 0.017 |
|  | Lower layer | Pd | 0.5 | CZ | Mg | MA1 | 5.0 | 10 |  |  |  |  |
| C17 | Upper layer | Rh | 0.5 | ZCLN | Ba | BA2 | 0.5 | 1 | 0.1 | 0.008 | 0.095 | 0.003 |
|  | Lower layer | Pd | 0.5 | CZYP | Ba | BA1 | 5.0 | 10 |  |  |  |  |
| C18 (Comparative Example) | Upper layer | Rh | 0.5 | ZC | Ba | BA8 | 11 | 22 | 1 | 0.052 | 0.227 | 0.111 |
|  | Lower layer | Pd | 0.5 | CZ | Ba | BA8 | 11 | 22 |  |  |  |  |
| C19 (Comparative Example) | Upper layer | Rh | 0.5 | ZC | Ba | BA9 | 11.5 | 23 | 1.05 | 0.058 | 0.232 | 0.119 |
|  | Lower layer | Pd | 0.5 | CZ | Ba | BA8 | 11 | 22 |  |  |  |  |

TABLE 5

| Catalyst | Catalyst layer | Correlation coefficient ρAl, AE |
|---|---|---|
| C5 | Upper layer | 0.81 |
|  | Lower layer | 0.81 |
| C6 | Upper layer | 0.80 |
|  | Lower layer | 0.80 |
| C7 | Upper layer | 0.82 |
|  | Lower layer | 0.81 |
| C8 | Upper layer | 0.80 |
|  | Lower layer | 0.80 |

TABLE 5-continued

| Catalyst | Catalyst layer | Correlation coefficient ρAl, AE |
|---|---|---|
| C9 | Upper layer | 0.78 |
|  | Lower layer | 0.78 |
| C10 | Upper layer | 0.79 |
|  | Lower layer | 0.78 |
| C11 | Upper layer | 0.81 |
|  | Lower layer | 0.77 |
| C12 | Upper layer | 0.81 |
|  | Lower layer | 0.78 |
| C13 | Upper layer | 0.76 |
|  | Lower layer | 0.75 |
| C14 | Upper layer | 0.80 |
|  | Lower layer | 0.80 |
| C15 | Upper layer | 0.78 |
|  | Lower layer | 0.78 |
| C16 | Upper layer | 0.78 |
|  | Lower layer | 0.77 |
| C17 | Upper layer | 0.81 |
|  | Lower layer | 0.81 |
| C18 | Upper layer | 0.75 |
|  | Lower layer | 0.75 |
| C19 | Upper layer | 0.74 |
|  | Lower layer | 0.75 |

TABLE 6

| Catalyst | Catalyst layer | Precious metal | Amount of precious metal (g/L) | Oxygen storage material | Alkali earth metal element | Introduction form | Amount of alkali earth metal element (g/L) | Mass ratio | Correlation coefficient ρAl, AE | Emissions NMHC (g/km) | Emissions CO (g/km) | Emissions $NO_X$ (g/km) |
|---|---|---|---|---|---|---|---|---|---|---|---|---|
| C20 | Upper layer | Rh | 0.5 | ZC | Ba | BA2 | 0.5 | 1 | 0.64 | 0.030 | 0.126 | 0.019 |
|  | Lower layer | Pd | 0.5 | CZ | Ba | BA1 | 5 | 10 | 0.65 |  |  |  |

<Evaluation of Dispersion Property of Alkaline-Earth Metal Element in Catalytic Layer (2)>

For each of the catalysts C5 to C20, the dispersion property of the alkaline-earth metal element in the catalytic layer was evaluated in a similar manner to that previously mentioned for the catalysts C1 to C4. The results are shown in Table 5 and Table 6.

<Evaluation of Exhaust Gas Purification Performance (2)>

For each of the catalysts C5 to C20, the exhaust gas purification performance was evaluated in a similar manner to that previously mentioned for the catalysts C1 to C4. The results are shown in Tables 2 to 4 and 6 and FIG. 3, together with the results for the catalyst C1.

Figure 3:
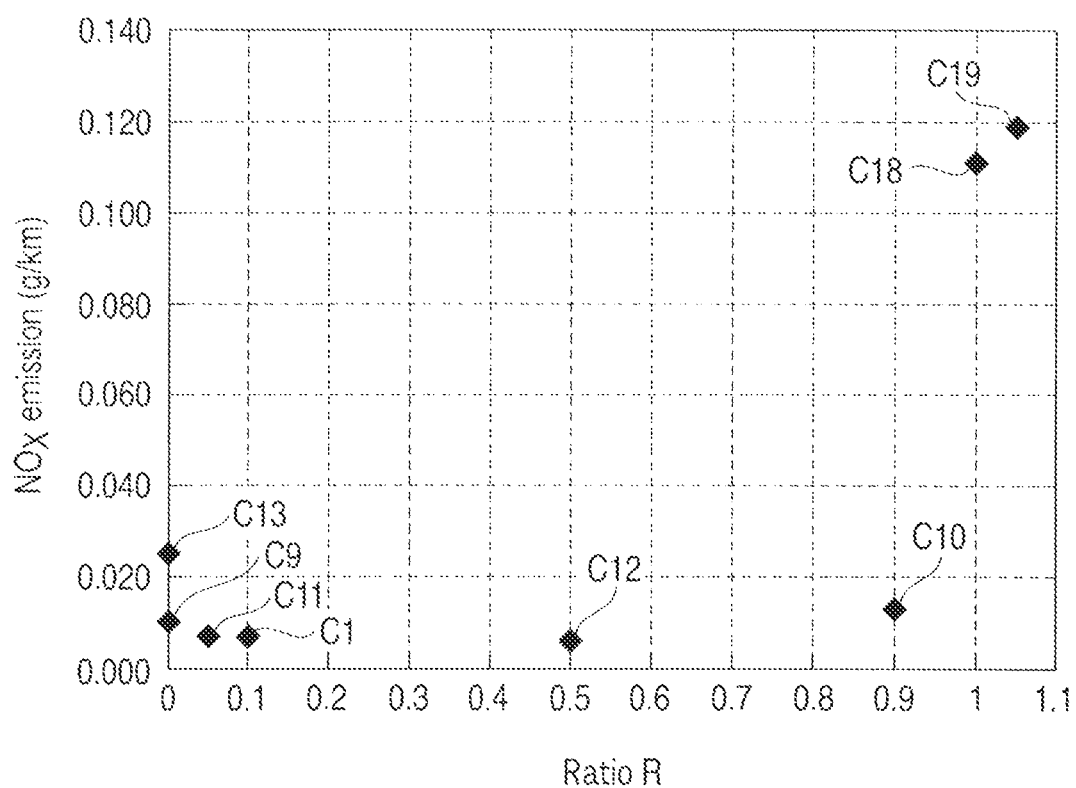
FIG. 3 is a graph that shows an example of the relationship between the ratio R and the emission of $NO_X$.

FIG. 3 is a graph showing an example of the above-mentioned relationship between the ratio R and the emission of $NO_X$.

As shown in Tables 2 to 6 and FIG. 3, excellent exhaust gas purification performance was achieved by setting the ratio R to less than 1. It is found that particularly excellent exhaust gas purification performance can be achieved by setting the ratio R to 0.001 or more and less than 1. Additionally, it is found that remarkably excellent exhaust gas purification performance can be achieved by introducing rare earth elements other than cerium as compared catalyst C1 and the catalyst C17.

As shown in Tables 1 to 6, particularly excellent exhaust gas purification performance was achieved by setting the correlation coefficient $\rho_{Al,AE}$ to 0.61 or more in both of the catalytic layers 20A and 20B.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An exhaust gas-purifying catalyst comprising:
a substrate;
a first catalytic layer facing the substrate and comprising at least one precious metal selected from the group consisting of palladium and platinum and alumina doped with an alkaline-earth metal element, a ratio of a total mass of palladium and platinum comprised in the first catalytic layer to a total mass of all precious metals comprised in the first catalytic layer being a first value, a ratio of a mass of rhodium comprised in the first catalytic layer to the total mass of all precious metals comprised in the first catalytic layer being a second value, and a ratio of a total mass of all alkaline-earth metal elements comprised in the first catalytic layer to the total mass of all precious metals comprised in the first catalytic layer being a third value; and
a second catalytic layer facing the substrate with the first catalytic layer interposed therebetween or intervening between the substrate and the first catalytic layer, the second catalytic layer comprising rhodium and alumina doped with an alkaline-earth metal element, a ratio of a mass of rhodium comprised in the second catalytic layer to a total mass of all precious metals comprised in the second catalytic layer being higher than the second value, a ratio of a total mass of palladium and platinum comprised in the precious metals to the total mass of all precious metals comprised in the second catalytic layer being lower than the first value, and a ratio of a total mass of all alkaline-earth metal elements comprised in the second catalytic layer to the total mass of all precious metals comprised in the second catalytic layer being lower than the third value,
wherein both of he first and second catalytic layers have a correlation coefficient $\rho_{Al,AE}$ given by the following formula (1) of 0.61 or more:

$$\rho_{Al,AE} = \frac{C_{Al,AE}}{\sigma_{Al}\sigma_{AE}} \tag{1}$$

wherein
$C_{Al,AE}$ and $\sigma_{AE}$ in the formula (1) are represented by the following formulae (2), (3) and (4), respectively:

$$C_{Al,AE} = \frac{1}{175}\sum_{i=1}^{175}(I_{Al,i} - I_{Al,av})(I_{AE,i} - I_{AE,av}) \tag{2}$$

$$\sigma_{Al} = \sqrt{\frac{1}{175}\sum_{i=1}^{175}(I_{Al,i} - I_{Al,av})^2} \tag{3}$$

$$\sigma_{AE} = \sqrt{\frac{1}{175}\sum_{i=1}^{175}(I_{AE,i} - I_{AE,av})^2} \tag{4}$$

in the formulae (2) to (4),
i is a natural number of 1 to 175,
$I_{Al,i}$ is intensity of a characteristic X-ray emitted by aluminum that is measured using an electron beam microanalyzer on the i-th intersection point among 175 intersection points of planes and a line perpendicular to a main surface of the first or second catalytic layer, the planes being obtained by dividing the first catalytic layer or second catalytic layer into 175 equal parts in the thickness direction,
$I_{Al,av}$ is an arithmetic average value $I_{Al,i}$ given by the following formula (5):

$$I_{Al,av} = \frac{1}{175}\sum_{i=1}^{175} I_{Al,i} \tag{5}$$

$I_{AE,i}$ is intensity of a characteristic X-ray emitted by the alkaline-earth metal element that is measured using the electron beam microanalyzer on the i-th intersection point, and $I_{AE,av}$ is an arithmetic average value of the $I_{AE,i}$ given by the following formula (6):

$$I_{AE,av} = \frac{1}{175}\sum_{i=1}^{175} I_{AE,i}. \tag{6}$$

2. The exhaust gas-purifying catalyst according to claim 1, wherein the second catalytic layer faces the substrate with the first catalytic layer interposed therebetween.

3. The exhaust gas-purifying catalyst according to claim 1, wherein the second catalytic layer intervenes between the substrate and the first catalytic layer.

4. The exhaust gas-purifying catalyst according to claim 1, wherein the second catalytic layer further comprises platinum.

5. The exhaust gas-purifying catalyst according to claim 1, wherein a ratio of the total mass of all alkaline-earth metal elements comprised in the second catalytic layer to the total mass of all precious metals comprised in the second catalytic layer is a fourth value, and a ratio of the fourth value to the third value is in a range of 0.001 to 0.9.

6. The exhaust gas-purifying catalyst according to claim 1, wherein a doping amount of the alkaline-earth metal element in each of the first and second catalytic layers is in a range of 0.1% to 20% by mass based on the mass of alumina doped with the alkaline-earth metal element.

7. The exhaust gas-purifying catalyst according to claim 1, wherein the first catalytic layer comprises only at least one of palladium and platinum as the precious metal, and the second catalytic layer comprises only rhodium or only rhodium and platinum as the precious metal.

8. The exhaust gas-purifying catalyst according to claim 1, wherein at least one of the alkaline-earth metal element comprised in the first catalytic layer and the alkaline-earth metal element comprised in the second catalytic layer is barium.

9. The exhaust gas-purifying catalyst according to claim 1, wherein:
the first catalytic layer is formed using a first slurry comprising at least one precious metal selected from the group consisting of palladium and platinum, alumina doped with an alkaline-earth metal element, and citric acid, and
the second catalytic layer is formed using a second slurry comprising rhodium, alumina doped with an alkaline-earth metal element, and citric acid.

\* \* \* \* \*